Sept. 28, 1965  H. HECKT  3,208,565
PNEUMATIC GEAR WHEEL MOTOR WITH A BRAKE OPERATED
ON INTERRUPTION OF THE AIR SUPPLY
Filed July 16, 1962  3 Sheets-Sheet 1

INVENTOR
Heinz Heckt

Malcolm W. Fraser
attorney

United States Patent Office

3,208,565
Patented Sept. 28, 1965

3,208,565
PNEUMATIC GEAR WHEEL MOTOR WITH A BRAKE OPERATED ON INTERRUPTION OF THE AIR SUPPLY
Heinz Heckt, Sprockhovel, Westphalia, Germany, assignor to G. Düsterloh, Fabrik für Bergwerksbedarf G.m.b.H., Sprockhovel, Germany, a corporation of Germany
Filed July 16, 1962, Ser. No. 209,850
Claims priority, application Germany, July 31, 1961, D 36,702
7 Claims. (Cl. 192—3)

The invention concerns a pneumatic gear wheel motor with a brake operated on interruption of the air supply.

Pneumatic gear wheel motors are used especially in mining for the driving of the most diverse machines, and have the characteristic that their rotors are free to rotate after the air supply is cut off. Should the machine driven by such a motor, as is often necessary in practice, be safeguarded against counter rotation, under the influence of a load after cut-off of the air supply, then the motor also requires a lock against counter rotation.

There are already known pneumatic gear wheel motors which have such a lock. The brakes for these have been arranged outside the actual rotor in a special housing, usuall on the driving shaft of the motor Their operation occurs simultaneously with the movement of the valve for the control of the air supply of the motor, in such a way that when the valve is opened the brakes are lifted against the influence of a slidable weight, a spring, or the like, which tend to apply the brake.

The known constructions of this kind are not compact because the inevitable space requirements of the extra counter-rotation lock and its bearings cause the motor unit to be larger and heavier.

According to the invention, a pneumatic gear wheel motor with a brake is provided, in which the inner space of the motor is used for accommodating the brake. The transfer thus achieved of the point of action of the braking directly to the rotating mass of the rotor and the omission of a special housing for the brake itself makes possible a motor safeguarded against counter rotation, of a size corresponding to previously known motors not having a lock to prevent counter rotation.

According to the invention there is provided a pneumatic gear wheel motor with a brake operated on interruption of the air supply, lifted against the operation of a spring lying against it when the air supply valve is open, the brake being arranged axially slidable and non-rotatable, and having brake surfaces, which on operation of the brake contact corresponding faces rotating with a rotor, wherein the brake is slidable along a rigid shaft in a bore in the interior of the rotor and coaxial therewith, and said faces are formed by the walls of the bore in the rotor.

Preferably, the brake is formed as the frustrum of a cone provided outwardly with brake surfaces, which bear against correspondingly cone shaped walls in the bore in the rotor.

The brake itself preferably has a cylindrical inner space and is guided on a piston-like addition to the rigid shaft, so that the spring lies between the inner front closing plate of the brake and the piston-like addition, while the inner rear closing plate is sealed on the rigid shaft, and thus with the piston-like addition and the corresponding part of the inner wall of the brake forms a pneumatic cylinder.

The supply of the air pressure operating the brake is achieved through a longitudinal bore axially through the rigid shaft, with a cross-bore leading into the internal space of the brake and a ventilating bore, of reduced diameter relative to the longitudinal bore, in connection with the internal space of the brake. The diameters of the longitudinal bore and the ventilating bore are so chosen relatively that a throttling effect occurs, which, when the longitudinal bore is open allows the build up of sufficient pressure to lift the brake, and when the longitudinal bore is closed nevertheless removes the pressure from the interior of the brake so that then the spring can put on the brake.

The supply of pressurized air to the longitudinal bore in the rigid shaft for operating the brake is achieved conveniently via a supply channel in the motor housing opening into the longitudinal bore, which channel is in connection with the operating air when the air supply valve is open.

If the new motor has a particularly heavy weight to move, it is of course possible according to a further embodiment of the invention to provide both rotors with bores and brakes.

The features and further characteristics of the invention will be described with reference to the accompanying drawings, in which.

Figure 1:
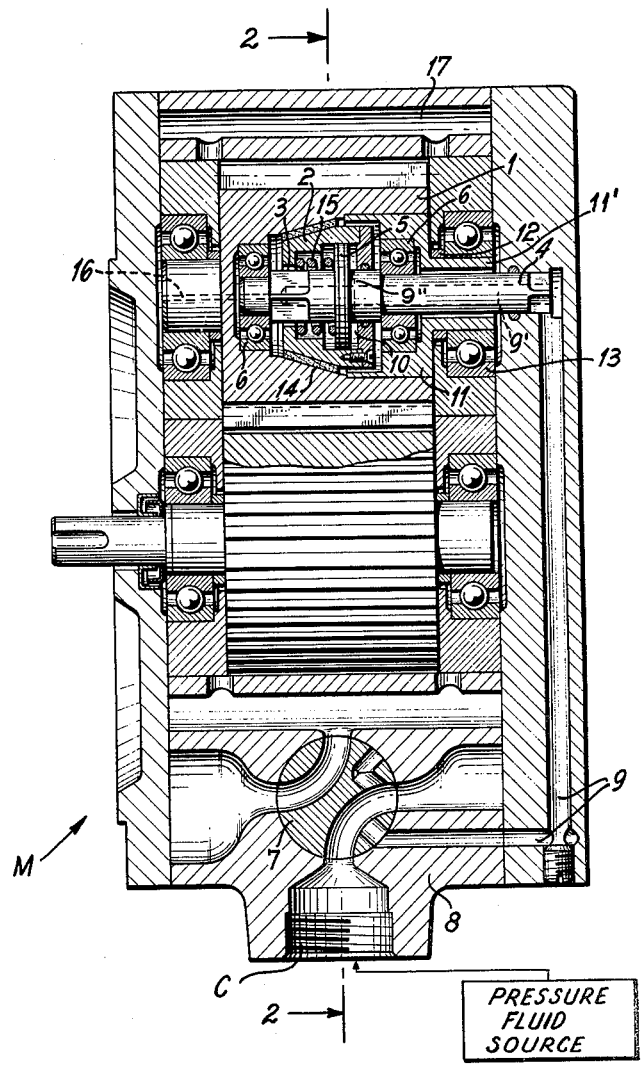
FIGURE 1 is an elevational view partially in section of a preferred embodiment of the invention with portions partially broken away to more clearly illustrate the structure.

In the pressure fluid actuated or pneumatic gear wheel motor and generally designated by reference character M, the rotor 1 thereof is bored out from one side. In the space so made is built a spring loaded brake 2 which is prevented from rotation by means of a suitable cross-sectional profile 3 (rectangular or the like) and can move in an axial direction on a shaft 4 fastened into the outer housing. In the interior space of the brake 2, the non-rotatable shaft 4 is formed with a piston-like addition 5, while the brake 2, sealed on the shaft 4, operates as a cylinder. The shaft 4 and thus the brake 2 are located between a pair of spaced apart ball races 6. The opening in the rotor 1 is closed by a cover 11, which on its outer side is formed as a stub axle 11' and by means of ball bearing assembly 13 and a distance or spacer ring 12 limits the axial position of the rotor 1.

Figure 2:
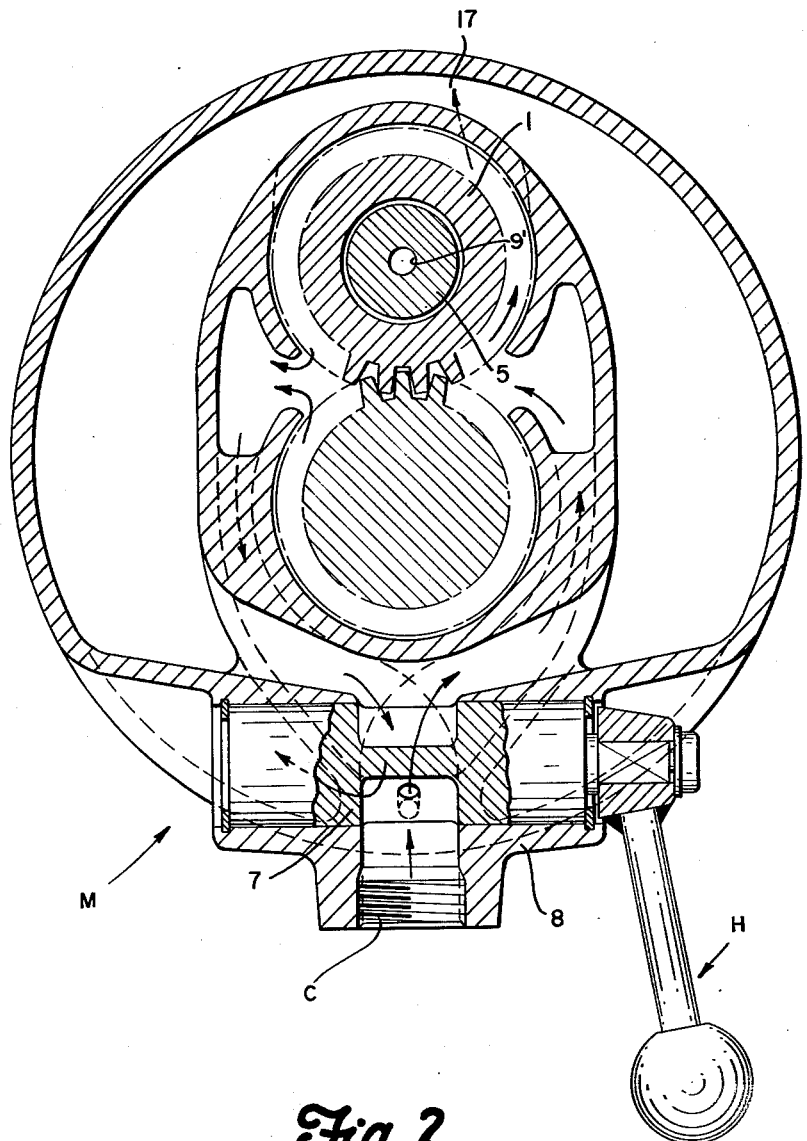
FIGURE 2 is a sectional view taken along lines 2—2 of FIGURE 1 diagrammatically illustrating the typical path of the pressure fluid flow through the motor.
Figure 3:
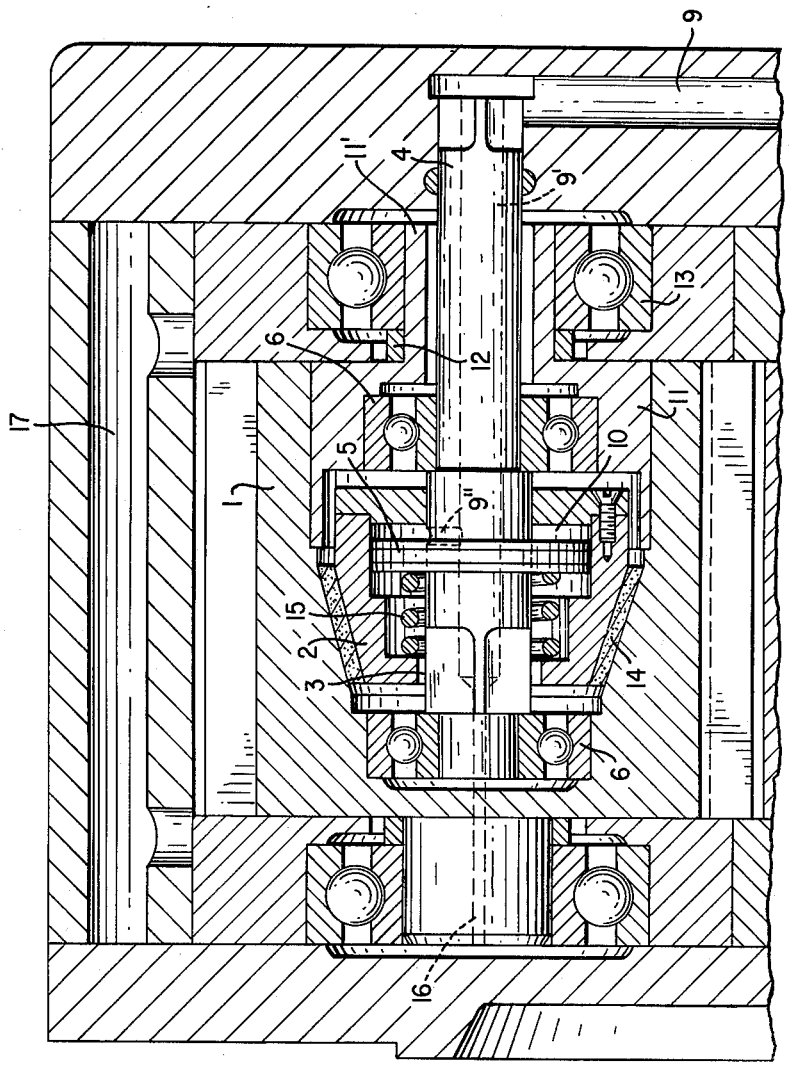
FIGURE 3 is an enlarged fragmentary view of the brake mechanism illustrated in FIGURE 1 with portions broken away to clearly illustrate the structure.

A remote source of pressure fluid is connected to the motor housing 8 and communicates with a supply channel 9 through a suitable threaded coupling which is connected to the internally threaded recess C formed in the housing 8. The threaded recess C, in turn, communicates with a rotary valve 7 which may be manually operated by an externally positioned control handle H (shown in FIGURE 2).

The supply channel 9 leads from the valve 7 of the motor housing 8 and communicates with a supply channel 9' through the drilled shaft 4 to the cylinder space 10, through a cross-bore channel 9". The channels 9, 9' and 9" provides a passage for the air flowing to the motor housing 8 when the valve 7 is in an open position, and is closed when the valve 7 is in a closed position. Thus it is achieved that, when valve 7 is open, the brake 2 is lifted from the seating 14 due to a build up of pressure within cylinder 10 so that the rotor can thus turn unhindered, while, immediately the valve 7 is shut or turned to its closed position, the brake 2 is again forced by the spring 15 against seating 14, in which position the air which has been stopped up can escape through a ventilating bore 16 into the exhaust space 17. The ventilating bore 16 is always open, even when the brake is off, but operates as a throttle since the diameter of the ventilating bore 16 is small relative to the supply bore 9'.

I claim:
1. A pressure fluid actuated motor having a housing;
at least one pressure fluid driven rotor mounted for rotation about an axis within said housing, said rotor having a cavity with a braking surface formed on a portion of the interior thereof and being coaxial therewith;
a pressure fluid inlet in said housing providing communication with a remote source of pressure fluid;
a brake member disposed within the cavity of said rotor, said brake member mounted for axial shifting movement into and out of engagement with the braking surface of the cavity of said rotor;
spring means disposed within the cavity of said rotor normally biasing said brake member into engagement with the braking surface of the cavity of said rotor; and
valving means for providing communication between the remote source of pressure fluid and said brake member and said rotor for axially shifting said brake member against the bias of said spring means out of engagement with the braking surface of the cavity of said rotor and simultaneously driving said rotor.

2. A pressure fluid actuated motor as defined in claim 1 wherein the cavity formed in said rotor is frusto-conically shaped, and said brake member includes a frusto-conically shaped element to correspond to the shape of the cavity.

3. A pressure fluid actuated motor as defined in claim 1 including a rigid shaft mounted coaxially with the rotational axis of said rotor, said shaft having a radially extending plunger element, said brake member having a cylindrical cavity formed therein for engagement with the outer surface of said plunger element for guiding the shifting movement of said brake member.

4. A pressure fluid actuated motor as defined in claim 3 wherein said valving means includes pressure fluid passage means providing communication between the fluid pressure source and the cylindrical cavity of said brake member.

5. A pressure fluid actuated motor as defined in claim 4 wherein the cylindrical cavity of said brake member is provided with fluid tight seal means.

6. A pressure fluid actuated motor as defined in claim 4 wherein said pressure fluid means includes a longitudinal bore extending axially in said rigid shaft, said bore being provided with a cross-bore communicating with the interior of the cylindrical cavity formed in said brake member.

7. A pressure fluid actuated motor as defined in claim 6 wherein said longitudinal bore is in communication with a ventilating bore of a reduced diameter relative to said longitudinal bore.

References Cited by the Examiner

UNITED STATES PATENTS

| | | | |
|---|---|---|---|
| 712,833 | 11/02 | Moore | 192—3 |
| 2,927,669 | 3/60 | Walerowski | 188—170 |
| 2,948,359 | 8/60 | Barrett | 188—170 |
| 3,043,412 | 7/62 | Bartholomaus et al. | 192—3 |
| 3,052,984 | 9/62 | Mitthauer et al. | |

DAVID J. WILLIAMOWSKY, *Primary Examiner.*

ROBERT C. RIORDON, *Examiner.*